(12) United States Patent
Pe Jimenez et al.

(10) Patent No.: US 7,346,551 B2
(45) Date of Patent: Mar. 18, 2008

(54) METHOD AND APPARATUS FOR CUSTOM STRATEGY SPECIFICATION IN A HOSTED ELECTRONIC TRANSACTION SERVICE SYSTEM

(75) Inventors: Michael Pe Jimenez, San Carlos, CA (US); Jeffrey Leroy King, Campbell, CA (US); Theodore Arthur Strout, Austin, TX (US); Timothy Robert Harding, Austin, TX (US)

(73) Assignee: Cybersource Corporation, Mountain View, CA (US)

( * ) Notice: Subject to any disclaimer, the term of this patent is extended or adjusted under 35 U.S.C. 154(b) by 846 days.

(21) Appl. No.: 10/328,936

(22) Filed: Dec. 23, 2002

(65) Prior Publication Data

US 2004/0122747 A1    Jun. 24, 2004

(51) Int. Cl.
    G06Q 30/00    (2006.01)
(52) U.S. Cl. ....................................... 705/26
(58) Field of Classification Search ........... 705/26, 705/27
    See application file for complete search history.

(56) References Cited

U.S. PATENT DOCUMENTS

| | | | |
|---|---|---|---|
| 5,212,791 A | 5/1993 | Damian et al. | 395/650 |
| 5,758,327 A | 5/1998 | Gardner et al. | 705/26 |
| 5,758,328 A | 5/1998 | Giovannoli | 705/26 |
| 5,883,810 A | 3/1999 | Franklin et al. | 364/479.02 |
| 5,924,077 A | 7/1999 | Beach et al. | 705/10 |
| 6,016,477 A | 1/2000 | Ehnebuske et al. | 705/7 |
| 6,085,171 A | 7/2000 | Leonard | 705/26 |
| 6,249,905 B1 | 6/2001 | Yoshida et al. | 717/1 |
| 6,862,573 B2 | 3/2005 | Kendall et al. | 705/7 |
| 6,993,502 B1 * | 1/2006 | Gryglewicz et al. | 705/31 |
| 2001/0044738 A1 * | 11/2001 | Elkin et al. | 705/8 |
| 2004/0210445 A1 * | 10/2004 | Veronese et al. | 705/1 |

FOREIGN PATENT DOCUMENTS

JP    2004-258816    *  9/2004

OTHER PUBLICATIONS

Brett McLaughlin "Java and XML: SOAP", O'Reilly Book Excerpts, 2nd Edition, Sep. 2001.*

Rowen, Robert "Diagnostic systems for manufacturing.", AI expert, v5, n4, p28(10), Apr. 1990. Retrieved from Dialog File: 275, Acc#: 01352722.*

(Continued)

Primary Examiner—Naeem Haq
(74) Attorney, Agent, or Firm—Hickman Palermo Truong & Becker LLP

(57) ABSTRACT

A merchant generates a customized service strategy related to a suite of electronic transaction services hosted by a service provider. The custom strategy specifies services to perform, and possibly an order in which to perform the services, by a service provider in relation to an electronic transaction associated with the merchant. Through use of a user interface, the strategy can be represented as a graphical decision tree, with terminal nodes representing services or actions. A customized strategy is transmitted to a service provider, as is transaction related information, whereby the service provider can service the transaction according to the strategy and based on the transaction information. Scheduling information that specifies different strategies to apply to different transaction scenarios can be generated. A strategy is selected by a service provider based on the scheduling information and transaction information, and is used to service one or more electronic transactions.

22 Claims, 13 Drawing Sheets

OTHER PUBLICATIONS

CyberSource Corporation, "CyberSource® Unveils First Extensible Decision Management Platform Designed to Centralize Control and Simplify Management of Transaction Risk Processes," Mar. 6, 2002, http:///www.cybersource.com/news_and_events/view.xml?page_id=825, printed Oct. 7, 2002, pp. 1-2.

CyberSource Corporation, "Product Brief, CyberSource Risk Manager 2.5, Risk Management," 2002, 7 pages.

CyberSource Corporation, "CyberSource® Risk Manager 3.0, User's Guide," Aug. 2002, 84 pages.

Notification of Transmittal of the International Search Report or the Declaration received in corresponding International application No. PCT/US03/37332.

Pending claims in corresponding International application No. PCT/US03/37332.

* cited by examiner

METHOD AND APPARATUS FOR CUSTOM STRATEGY SPECIFICATION IN A HOSTED ELECTRONIC TRANSACTION SERVICE SYSTEM

FIELD OF THE INVENTION

The present invention generally relates to electronic transaction services. The invention relates more specifically to a method and apparatus for custom strategy specification in a hosted electronic transaction service system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Electronic and online transactions are a popular means of commerce. For example, in retail and business-to-business transactions, the use of credit, debit and bank cards to facilitate the exchange of value for goods and/or services is quite common. All uses of credit, debit and bank cards can be considered electronic transactions, for they almost always entail the electronic transmission of information from one place to another.

For example, in the context of a "brick and mortar" point of purchase, a magnetic strip on a card is swiped through an electronic card reader to read information about the customer, or card holder. This information, along with transaction-specific and merchant information, is transmitted electronically to a destination, such as an electronic transaction service provider or payment clearinghouse. In the context of online or Internet transactions, various information is submitted by a customer through a computer, which is then transmitted electronically to the merchant and/or to a third party service provider. In the context of business-to-business transactions, similar electronic exchanges of value for goods or services occur, albeit typically through means other than credit, debit and bank cards.

There are organizations that are in the business of providing third party services to facilitate electronic transactions. In this context, a third party means a party other than the merchant or customer. For example, some organizations provide various services in support of electronic transactions between merchants and customers, such as transaction authorization, payment crediting and billing services. Further, a more comprehensive electronic transaction service provider might provide numerous other services in support of and in processing of electronic transactions, such as fraud screening, tax calculation, export compliance checks, delivery address verification, Internet and/or electronic mail address verification, and the like.

One protocol used to exchange commercial transaction related information between a merchant and an electronic transaction service provider is the Simple Object Access Protocol (SOAP), an emerging standard message protocol. SOAP provides a mechanism for a program running in one operating system to communicate with a program running in the same or another operating system, by using the Hypertext Transfer Protocol (HTTP) and Extensible Markup Language (XML) as the mechanisms for information exchange. SOAP specifies how to encode an HTTP header and an XML file so that a program in one computer can call a program in another computer and pass it information, and how the called program can return a response.

In addition to containing transaction related information, a SOAP message from a merchant to a service provider may contain service related information. That is, a given SOAP message associated with a given transaction may specify services that are to be applied to the transaction. For example, a SOAP message might contain an identifier of a product or service, a credit card number, a delivery address, and identifiers of one or more services to be applied to the transaction associated with the message.

A merchant may purchase a software application or system that is installed on merchant-owned computer equipment, such as a server, and that provides electronic transaction services, or at least an interface to third party transaction services. In this context, the application is maintained and managed by the merchant, as are any interactions with service providers that provide the services used by the merchant and interfaced by the application. However, the cost of ownership, maintenance and management of such a system may be undesirable to some merchants.

Management of an application installed on a merchant-owned computer may include implementation of business rules, referred to primarily herein as strategies, for applying to the merchant's electronic transactions. For example, a merchant may create business rules or a workflow regarding the evaluation of risk or the screening for fraud with respect to its transactions, through creation of custom strategies. The custom strategies can be applied to an automated review and decision-making process with respect to the merchant's transactions. Comprehensive modifications to a service strategy may require a significant programming effort and are, therefore, undesirable or unfeasible to many merchants.

For example, CyberSource Risk Manager, a software solution offered by CyberSource Corporation, provides the ability to create custom business strategies in the context of an order decision and risk management application. Furthermore, the application provides for constructing and representing business rules graphically through an HTML-based interface. FIG. 7 is an illustration of a simple example of a graphical representation 700 of a business strategy, wherein an order is rejected if originating from a specific country, is reviewed if for over $500 or requested same-day shipping, and is otherwise accepted. Each decision block has an underlying condition or logic that can be evaluated to "True" or "False" by a decision server to arrive at a decision as to whether to accept, review or reject a given transaction according to the business rule embodied in the strategy.

In contrast to a merchant-owned application or system, a transaction service provider may offer, and a merchant may use, hosted electronic transaction services. In this context, the services are provided using computers or other equipment and software that are generally maintained and managed by the transaction service provider, with little or no cost of ownership, maintenance or management to the merchant. Therefore, and significantly, the merchant has little or no control over the manner in which the services are applied to the merchant's transactions. Thus, services are provided by the service provider to the merchant in the form of a fixed service strategy pursuant to an agreement. The service strategy includes a fixed, specified order in which services are provided. Any changes to the predetermined order in which services are performed, that is, to a service strategy, is pursuant to an additional or revised agreement.

Merchants can specify, in a SOAP message for example, the behavior of one or more services from a set of default services when processing a given transaction associated with the message. For example, merchants can affect behavioral "switches" or commands associated with transaction processing services, such as modifying a service output action based on results of a given service. However, merchants are limited to customization of service behavior and have no control over the flow or order of performance of the services offered by the host.

Based on the foregoing, there is a clear need for an improved mechanism for merchant-driven management of electronic transaction service suites based on merchant business rules. Further, there is a need for a mechanism to simply and remotely control or customize service strategies associated with a hosted electronic transaction service system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
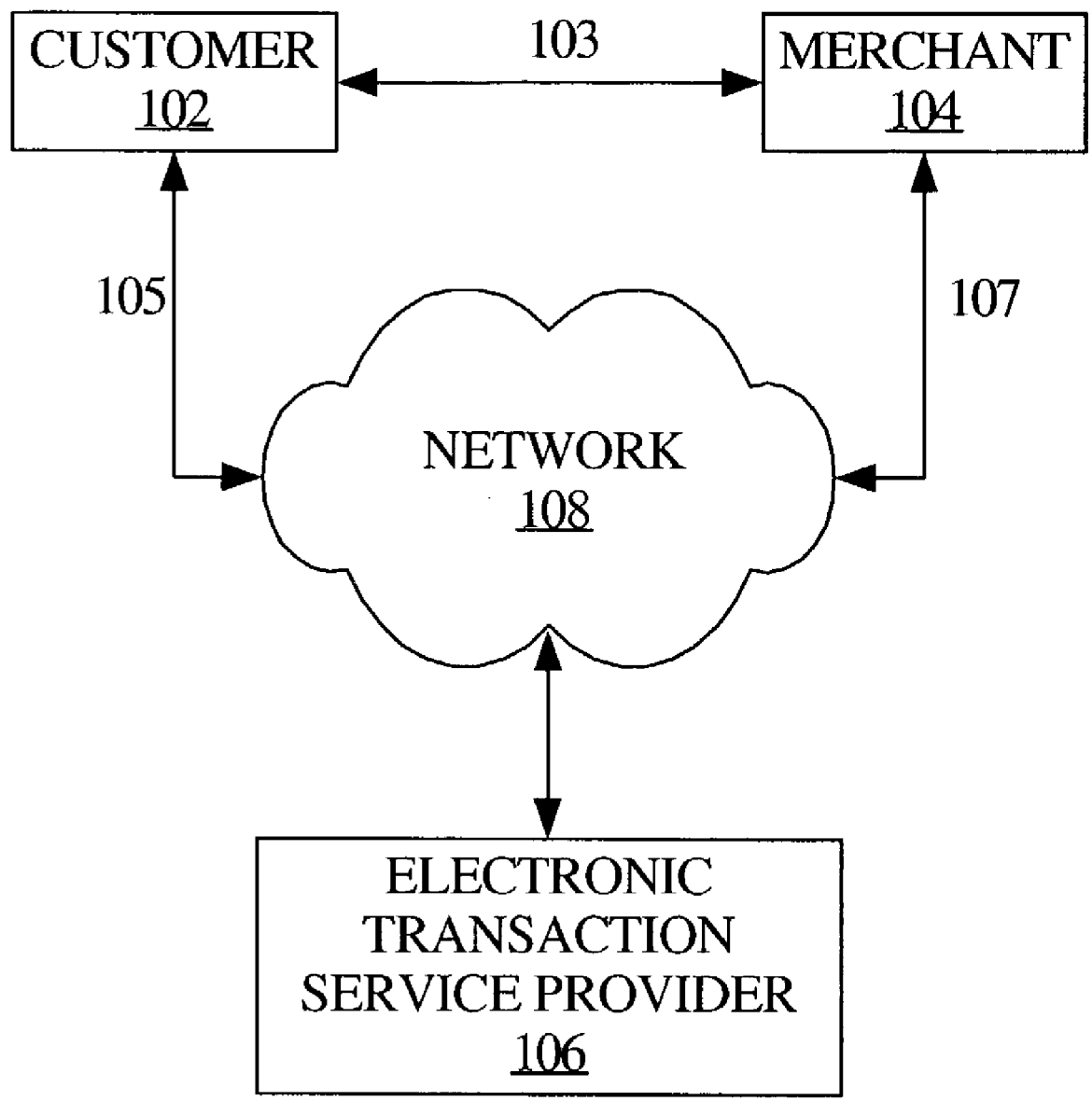
FIG. 1 is a block diagram of an example of an operating environment in which embodiments of the invention can be implemented.

A method and apparatus for custom strategy specification in a hosted electronic transaction service system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

According to one aspect, a method for processing transactions in a hosted electronic transaction service system based on a custom strategy comprises receiving a strategy from a merchant. The strategy specifies one or more services to perform in relation to an electronic transaction associated with the merchant. Transaction information associated with an electronic transaction is received from a merchant, and the transaction is serviced according to the strategy and based on the transaction information. In an embodiment, the strategy further specifies an order in which to perform the one or more services. In another embodiment, a strategy includes a conditional expression.

According to another aspect, a method for customizing a hosted electronic transaction service system comprises generating a strategy, wherein the strategy specifies one or more services to perform in relation to an electronic transaction associated with a merchant. The strategy may include a conditional expression. The strategy is transmitted to a host of electronic transaction services. Further, transaction information associated with an electronic transaction is transmitted to the host, and the transaction is serviced according to the strategy and based on the transaction information.

In an embodiment, the strategy is generated by representing the strategy as a graphical decision tree. According to various embodiments, the nodes of the graphical decision tree that represents a service strategy for hosted electronic transaction services can represent a service provided by a service provider or can represent a merchant or client specified action.

Through use of a custom strategy user interface, a merchant can construct and generate a customized service strategy related to a suite of electronic transaction services offered by a service provider, without having to program a software application. Hence, people without experience in computer programming can easily create or modify a strategy and, thus, remotely affect the behavior of the service provider's service system. Furthermore, the merchant can request that its transactions are processed in a certain manner, without having to modify the nature of the transaction information typically provided to the service provider.

According to embodiments, scheduling information is generated and transmitted from a merchant to a service provider. The scheduling information specifies a first strategy to be used to service one or more first transactions associated with the merchant and a second strategy to be used to service one or more second transactions associated with the merchant. A strategy is selected by a service provider based on the scheduling information and transaction information. The strategy is used to service the electronic transaction represented by the transaction information.

According to embodiments, receiving or transmitting a strategy includes receiving or transmitting, respectively, (1) a strategy that specifies a first strategy to use to service an electronic transaction when a transaction information is in a first state and a second strategy to use to service an electronic transaction when the transaction information is in a second state; and (2) a strategy that specifies a second strategy to be used to further service the electronic transaction when a first strategy outputs a first result and a third strategy to be used to further service the electronic transaction when the first strategy outputs a second result.

Operating Environment Example

FIG. 1 is a block diagram of an example of an operating environment in which embodiments of the invention can be implemented.

FIG. 1 depicts a customer 102, a merchant 104, and an electronic transaction service provider 106 ("service provider"), communicatively connected through a network 108. The environment illustrated in FIG. 1 is referred to as a hosted service environment, wherein the service provider 106, acting as a "host", hosts services for clients, such as merchants 104. A merchant 104 can transmit information associated with electronic transactions to a service provider 106. The service provider 106 performs one or more services based at least on the transaction information received from the merchant 104.

Customer 102 is, generally, any entity that is a purchaser of products or services via an electronic transaction. Non-limiting examples include a person who purchases or licenses goods at a retail store using a credit card, a person who purchases or licenses goods through the public Internet, and a business representative who purchases a business commodity or service through the public Internet. Merchant 104 is, generally, any entity that offers goods or services in exchange for value.

Service provider 106 is a third party other than the customer and merchant, that provides services in support of electronic transactions. Non-limiting examples of such services include services related to credit card authorization, risk evaluation and management, fraud screening, tax calculation, export compliance verification, delivery address verification, Internet and/or e-mail address verification, payment crediting, billing, and the like. Service providers 106 may invoke service features of other service providers in support of their service offerings. Network 108 is any private or public network, or a combination of private and public networks. For example, network 108 may comprise the public Internet or the PSTN (Public Switched Telephone Network).

Customer 102 and merchant 104 may communicate directly, such as at a point of purchase, as represented by link 103. Alternatively, customer 102 and merchant 104 may communicate indirectly through network 108 on links 105 and 107, such as with Internet-originated transactions. As part of a purchasing process, certain information is collected from the customer 102 by the merchant 104 or an associated agent. Non-limiting examples of information collected from a customer 102 include information about the credit or bank card used for the transaction, the item purchased, and shipping and billing addresses.

Once various transaction and customer related information is collected by a merchant 104, the merchant transmits at least a portion of the information to a service provider 106 through network 108. Additional information may be transmitted along with the information described. For example, merchant 104 may transmit customized data or a specification of service provider 106 services to apply, or to ignore, in the electronic transaction processing that is provided by the service provider 106. Although not limited to any specific information, the types of information described above are referred to collectively herein as "transaction information." Furthermore, according to embodiments described herein, customer-specified service strategies and schedules may also be transmitted from a merchant 104 to a service provider 106. Any or all of the information referenced above, which is transmitted from a merchant 104 to a service provider 106, may be transmitted through network 108 in any suitable protocol. An example of a suitable protocol is the Simple Object Access Protocol.

Service provider 106 performs one or more services in relation to the electronic commercial transaction associated with transmitted transaction information. Typically, when not implementing embodiments described herein, service provider 106 performs services in a manner predetermined by the service provider 106, unless merchant 104 uses an "ignore" command in a transmission to a service provider 106. For example, specific services are performed in a specific order for specific merchants 104, according to a service provider default or to an agreement between the merchant 104 and the service provider 106. Furthermore, when not implementing embodiments, the manner of processing transactions for a given merchant 104 applies to all transactions submitted by a merchant 104 to a service provider 106.

Service Provider Functional Components

Non-limiting examples of various services that may be provided by a service provider 106 are described as follows.

Payment Services

1. Credit Card Services provide real-time Internet payment processing that is secure and reliable, supporting real-time authorization to many credit card processors and foreign banks in multiple currencies worldwide. Settlements requested by merchants 104 are compiled, submitted, and archived by service provider 106. Service provider 106 may also provide transaction reports on reconciliation payments for auditing against bank-issued reports.

2. Electronic Check Services enable a merchant 104, as well as electronic commerce-enabled businesses and government institutions, to accept personal or business checks online, in real-time, as payment for goods and services. Service provider 106 may supply all of the back-office functionality required to facilitate the funds transfer.

3. Tax Calculation provides accurate electronic commerce tax calculation for United States and foreign jurisdictions, and may support Value Added Tax calculations for countries worldwide.

Stored Value Services

1. Stored Value Services enable merchants 104 to create and redeem private-label certificates without building the transaction processing infrastructure. Using service provider 106 technology, merchant certificates can be produced with the look and feel of the merchant's company and products. Service provider 106 creates a stored value, or certificate, account for each certificate. Recipients use certificates to purchase products and services available on the merchant's Web site, while service provider 106 maintains each certificate account.

Risk Management Services

1. Advanced Fraud Screen enables a merchant 104 to determine the level of risk it wants to accept in an electronic transaction. A merchant 104 can vary the risk threshold and risk characteristics by product, and can also define parameters for certain risk factors and control the weight of those factors in determining the overall risk score.

Fulfillment Management Services

1. Delivery Address Verification substantiates a customer's 102 deliverable address for physical shipment in domestic and international countries, leveraging domestic and international postal service databases.

2. Digital Delivery provides secure electronic delivery of digital content, for example, software, stock photography, documents, etc.

3. Digital Warehousing provides secure warehousing of a merchant's 104 downloadable software.

Distribution Control Services

1. Policy Compliance provides real-time electronic commerce distribution control to maintain merchant 104 contractual marketing policies and distribution agreements (e.g., territory management).

2. Export Compliance enables you to control the distribution of products and services in order to comply with the U.S. Government's Export Administration Regulations, thus protecting a merchant 104 from possible export violations. Export Compliance checks lists of denied countries and multiple denied persons lists from various government agencies such as the Department of Commerce, compares order information against databases and uses geo-location technology to validate the information submitted by a customer 102. Service provider 106 may also perform a secondary check on the transaction history of the IP address to identify any inconsistencies in ship-to or bill-to requests.

3. Digital Product Rights Management provides benefits to businesses that sell or distribute digital products over the Internet. Service provider 106 prepare digital products for electronic distribution using conventional technologies, thus allowing an intellectual property (IP) owner to issue licenses and retain rights information globally without maintaining key servers and associated infrastructure. Service provider 106 may provide the rights registry services required to issue licenses on a merchant's 104 or IP owner's behalf, issue records for reporting, and record subsequent requests for returns or reissuance of the property.

The preceding are examples of services that may be offered by a service provider 106 or utilized by a merchant 102, in conjunction with embodiments of the invention described herein. However, services are not limited to the preceding examples.

Service Provider Functional Components

Figure 2:
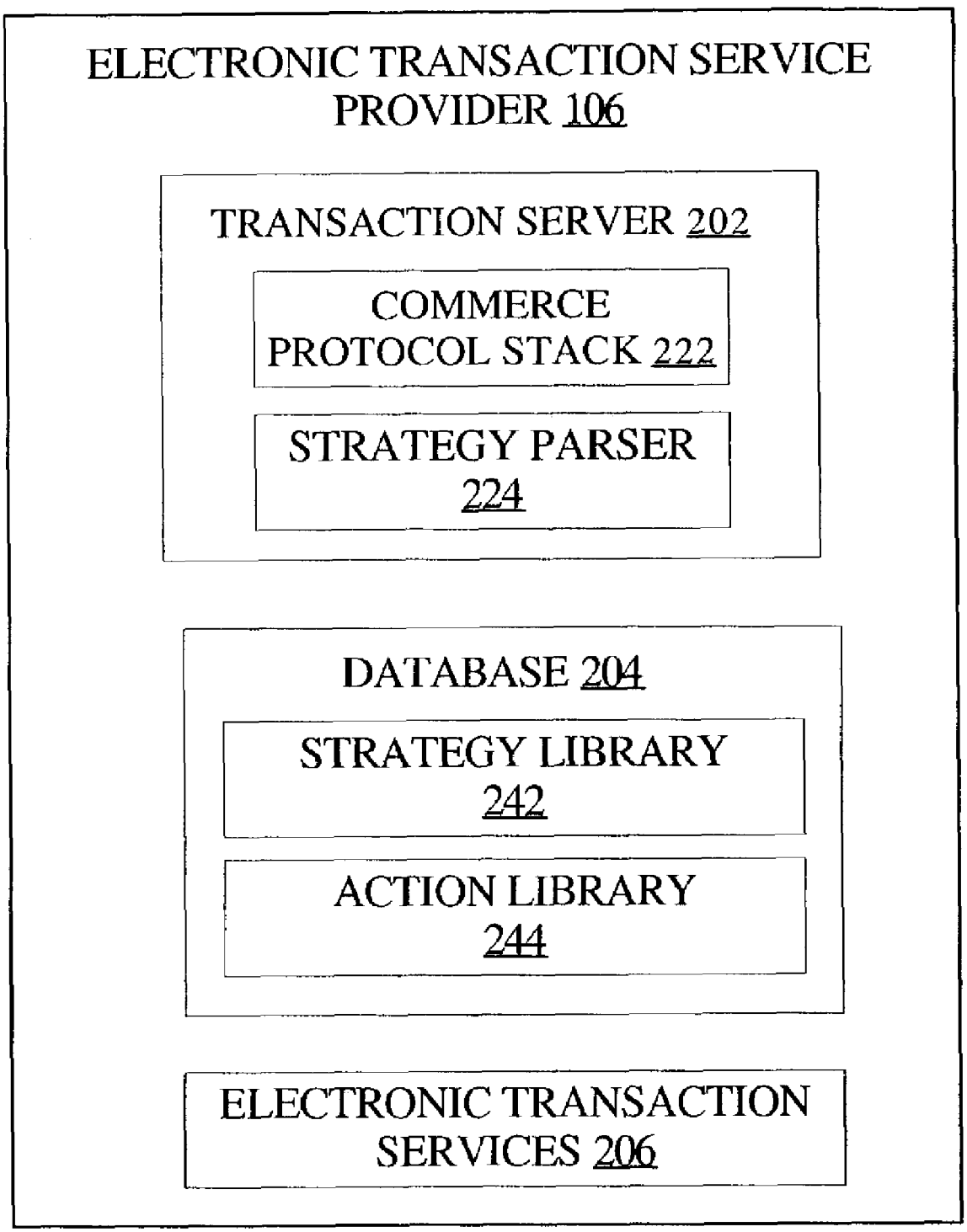
FIG. 2 is a block diagram that illustrates functional and real components utilized by a service provider in customizing a hosted electronic transaction service system.

FIG. 2 is a block diagram that illustrates functional and real components utilized by a service provider 106 in a hosted electronic transaction service system that provides custom strategy specification. The components of FIG. 2 are further used in processing electronic transactions. Service provider 106 includes a transaction server 202, a database 204 and electronic transaction services 206.

Transaction server 202 and its elements depicted in FIG. 2 can be implemented as computer software, hardware, or a combination of software and hardware. Transaction server 202 comprises a commerce protocol stack 222, for communicating with merchants 104 that utilize a compatible protocol stack. Commerce protocol stack 222 represents software elements and processes used to communicate transaction and other information among a service provider 106 and any number of similarly configured merchants 104. For a non-limiting example, protocol stack 222 may comprise software elements and processes that implement SOAP.

Transaction server 202 further comprises a strategy parser for parsing strategies transmitted from a merchant 104 to, and stored at, a service provider 106. Preferably, a strategy is created by a merchant 104 and transmitted for storage to a service provider 106 independent of transaction related information. That is, transmission of custom strategies and transmission of transaction information are, preferably, asynchronous. However, embodiments are not limited to asynchronous transmission of strategy and transaction information.

A strategy generally represents a manner in which one or more electronic transactions are processed by a service provider 106, and actions to perform in response to service results. A strategy can include an ordered specification of services that a given merchant wants applied to electronic transactions that are associated with, or originate from, the given merchant. A strategy describes a flow diagram of rules that comprises a logical hierarchy in which actions are distinguishable from evaluations and an order of processing is programmatically determinable. Each element of a strategy may be attributed with information that describes and documents that element, such as its name and version. Strategies can be unique to different merchants 104. Further, a merchant 104 may create and use multiple strategies and, further, may specify the manner of application, or scheduling, of the multiple strategies.

Rules typically include literal and variable values along with arithmetic and logical operators applicable to those values. Rules evaluate to a boolean value, e.g., true or false, and a respective action to take in response to the boolean value. Actions include another rule to evaluate, a decision termination point, or an instruction to call a service.

For example, merchant 104 may use a first strategy for transactions that entail less than a specific dollar amount and may use a second strategy for transactions that entail more than the specific dollar amount. For another example, a merchant 104 may want to use different strategies for different times of the year, such as a first strategy for a period leading up to the year-end holiday buying season and a second strategy for the summer months and third strategy for the remaining time periods. For yet another example, a merchant 104 may want to test a newly created strategy and request that it only be used during the weekend or during certain times of day. The preceding are only examples of uses of multiple service strategies, and the invention is not limited to these examples.

Strategy parser 224 is not limited to any specific type of parser, and may comprise any conventional or proprietary parser that is suitable to the type of language in which strategies are defined. Generally, a parser is computer code which is capable of identifying constituent parts of data so that it can be managed by other programs or code. Parsing can include the conversion of the parts into logic that is understood by a computer. An example of a strategy parser 224 is an XML (Extensible Markup Language) parser, which parses XML documents and converts them to programming logic or a data representation, which can be further implemented as programming objects, data structures, and the like. In one embodiment, strategies are represented as XML documents, and strategy parser 224 is an XML parser. Service provider 106 (FIG. 1) can define a well-formed strategy in relation to an associated parser. For example, an XML DTD (Data Type Definition) can be used to define the structure of an XML document that embodies one or more strategies.

Once strategies are received by service provider 106, they are stored in strategy library 242 of database 204. Strategies may be stored in database 204 in a native format, which is retrieved and parsed when necessary, or stored in a logical format in which the strategy has already been parsed and converted into programming logic. Database 204 can be any conventional database and database management system. Database 204 comprises a strategy library 242 and an action library 244.

Strategy library 204 stores a library of strategies generated by various merchants 104 that are clients of host service provider 106. For example, if strategies are represented in XML format, then strategy library 204 comprises XML documents or files. Strategies may be stored in strategy library 242 of database 204, in formats other than XML or in non-native or compressed formats.

In response to receiving transaction information from a merchant 104, the transaction server 202 of service provider 106 accesses database 204 to retrieve a service strategy to apply to the given transaction. Transaction server 202 then applies the services to the electronic transaction represented by the received transaction information, according to the retrieved service strategy and based on the transaction information. Transaction server 202 communicates results of the performed services to merchant 104 through use of commerce protocol stack 222. For example, if the service being provided by service provider 106 is solely a card authorization service, then service provider 106 returns a "card authorized" message to merchant 104. Communications from service provider 106 to merchant 104 preferably use the same protocol, such as SOAP, as the protocol in which they received the transaction information.

Action library 244 stores a library of actions that are available for specification by merchants 104, and which are performed by a service provider 106 as part of processing electronic transactions for merchants 104. Merchant 104 can specify service triggers to various actions in action library 244; that is, merchant 104 can mix and match actions with services. Merchant 104 can specify a specific action to perform in response to a given service, or can specify a specific action to perform in response to a specific result of a given service. For example, a merchant 104 may specify that an action of sending an e-mail to one or more persons affiliated with the merchant 104 is performed for any transactions over a certain dollar amount that receive a fraud risk score within a specified range.

According to one embodiment, merchant 104 can specify an action that stores service results in a case management system, for subsequent review and/or manipulation. For example, a given service or combination of services may reach a certain conclusion with respect to a given transaction, whereby an indication of the result is stored in a case management system file for review by merchant 104. Upon review, merchant 104 may decide an ultimate action to perform in response to the result stored in the case management file. For example, even though a given transaction was evaluated according to a fraud service to be a risky transaction, which is indicated in the case management system, merchant 104 may make an exception to their usual business rule and accept the transaction with knowledge that the risk factor exceeds the merchant's usual fraud risk threshold. With the case management system, certain "flagged" transactions can be reviewed by merchant 104 on a case-by-case basis.

Action library 244 and strategy library 242 of database 204 facilitate the preceding capabilities. In one embodiment, the action library 244 contains information to link respective actions with a respective merchant 104 according to merchant customization. Alternatively, information linking actions with merchants 104 may be stored in strategy library 242 in association with one or more strategies related to the relevant merchant 104, or may be stored elsewhere.

Electronic transaction services 206 represent one or more services that a service provider 106 provides in relation to electronic transactions. For a non-limiting example, electronic transaction services 206 can include any or all of the following: transaction authorization, payment crediting, billing, fraud screening, tax calculation, export compliance checks, delivery address verification, Internet and/or electronic mail address verification. The preceding list is not considered comprehensive, for other services could be developed and offered by a service provider 106 as part of electronic transaction services 206.

Figure 3A:
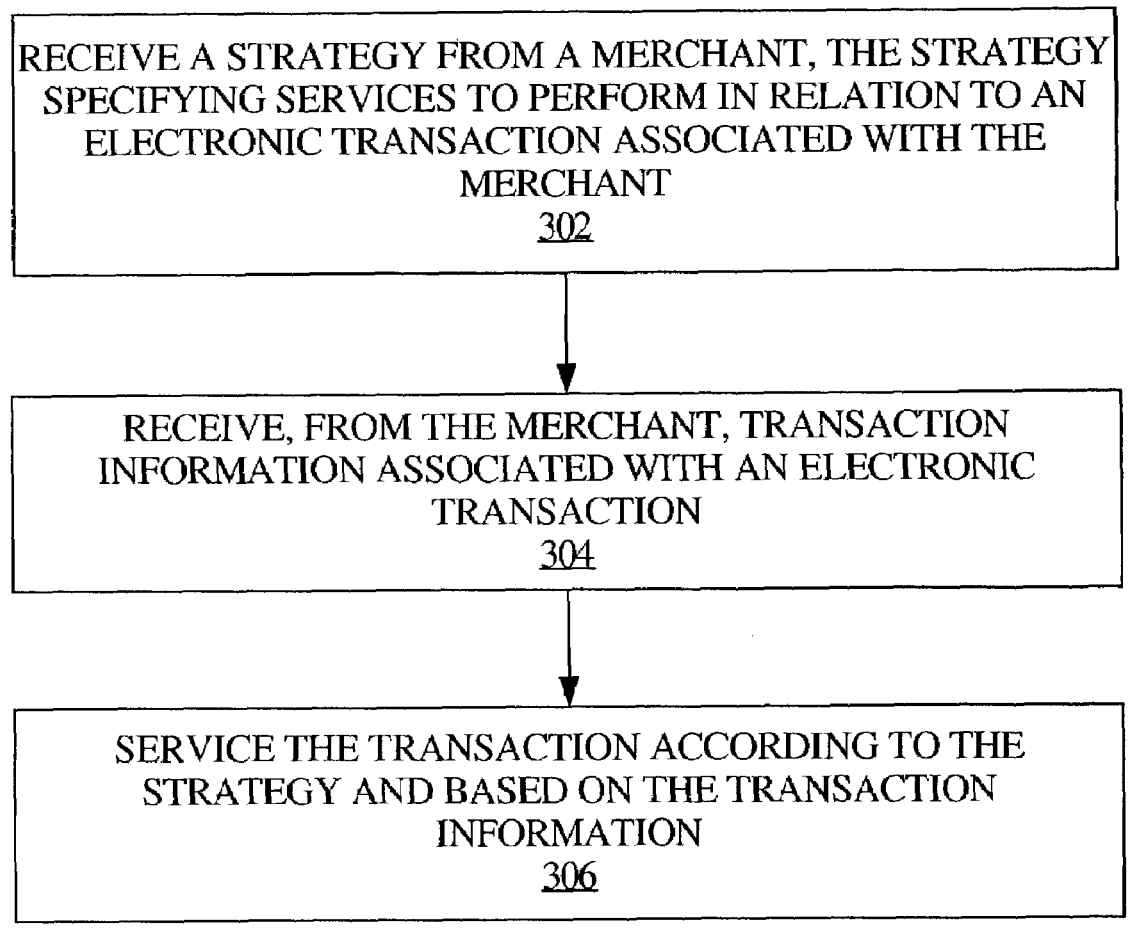
FIG. 3A is a flowchart that illustrates a process for using a hosted electronic transaction service system to process merchant transactions with custom service strategies.

Process for Using a Hosted Electronic Transaction Service System to Process Transactions with Custom Service Strategies FIG. 3A is a flowchart that illustrates a process for using a hosted electronic transaction service system to process merchant transactions with custom service strategies.

At block 302, a strategy is received from a merchant. For example, a strategy is received by a service provider 106 from a merchant 104 (FIG. 1). A strategy may specify one or more services to perform in relation to one or more electronic transactions associated with the merchant. Manners in which a strategy is generated are described below in reference to a merchant 104 of FIG. 4.

In an embodiment, a strategy specifies an order in which to perform the one or more services specified in the strategy. For example, a merchant 104 (FIG. 1) may specify that a fraud screening service is performed before a payment crediting service, and after an address verification service.

Furthermore, in one embodiment, a strategy includes a conditional expression. For example, a merchant 104 (FIG. 1) may define a strategy that includes logic such as "if transaction amount is less than $1000, then do not perform fraud screening; but if transaction amount is equal to or greater than $1000, then perform fraud screening followed by address verification." For another example, a merchant 104 may derive a strategy that includes logic such as "if transaction is for a specific product and the shipping address is to a specific country, then perform fraud screening and export compliance verification prior to transaction authorization, and then perform tax calculation if each of the previous services produces an acceptable result." Any conditional expressions and logical operators or constructs can be used to generate an electronic transaction service strategy.

In one embodiment, strategies are described in XML format. For example, an application executing on a merchant 104 (FIG. 1) machine may be used to construct a service strategy, which is converted to logical code. For example, the application may be a web application residing at service provider 106 with portions that execute at merchant 104. The code representing the strategy is converted into a document or file in XML format, and sent to a service provider 106 (FIG. 1). In turn, the service provider 106 retrieves and parses the strategy into computer programming logic that can be executed at the service provider 106 site, which aids in directing the services performed.

At block 304, transaction information associated with an electronic transaction is received from the merchant. Transaction information can include information such as a merchant identifier, an identifier of the goods being exchanged, the value amount of the exchange, a credit card number to be applied to the exchange, and billing address of the customer. Transaction information can include any information necessary to perform a hosted service in relation to an electronic transaction.

At block 306, the transaction to which the transaction information applies is serviced according to the strategy that was received at block 302 and based on the transaction information received at block 304. Thus, a process for a service provider 106 (FIG. 1) to receive and apply, in relation to one or more transactions, a merchant-customized service strategy associated with a hosted suite of services offered by the electronic transaction service provider, is described.

For example, execution of block 306 includes parsing the strategy received at block 302 to form a decision structure and traversing the decision structure. Traversing the decision structure includes evaluating any conditional operators encountered in the traversal. Upon encountering a terminal node of the decision structure, a service or action represented by the terminal node is selected at the service provider 106. Furthermore, the transaction information received at block 304, which may be embedded in a SOAP message, is parsed and pertinent values or parameters passed to the selected service process. A transaction server, such as transaction server 202 continues to traverse the decision structure and iterate the foregoing process as each terminal node is encountered.

Figure 3B:
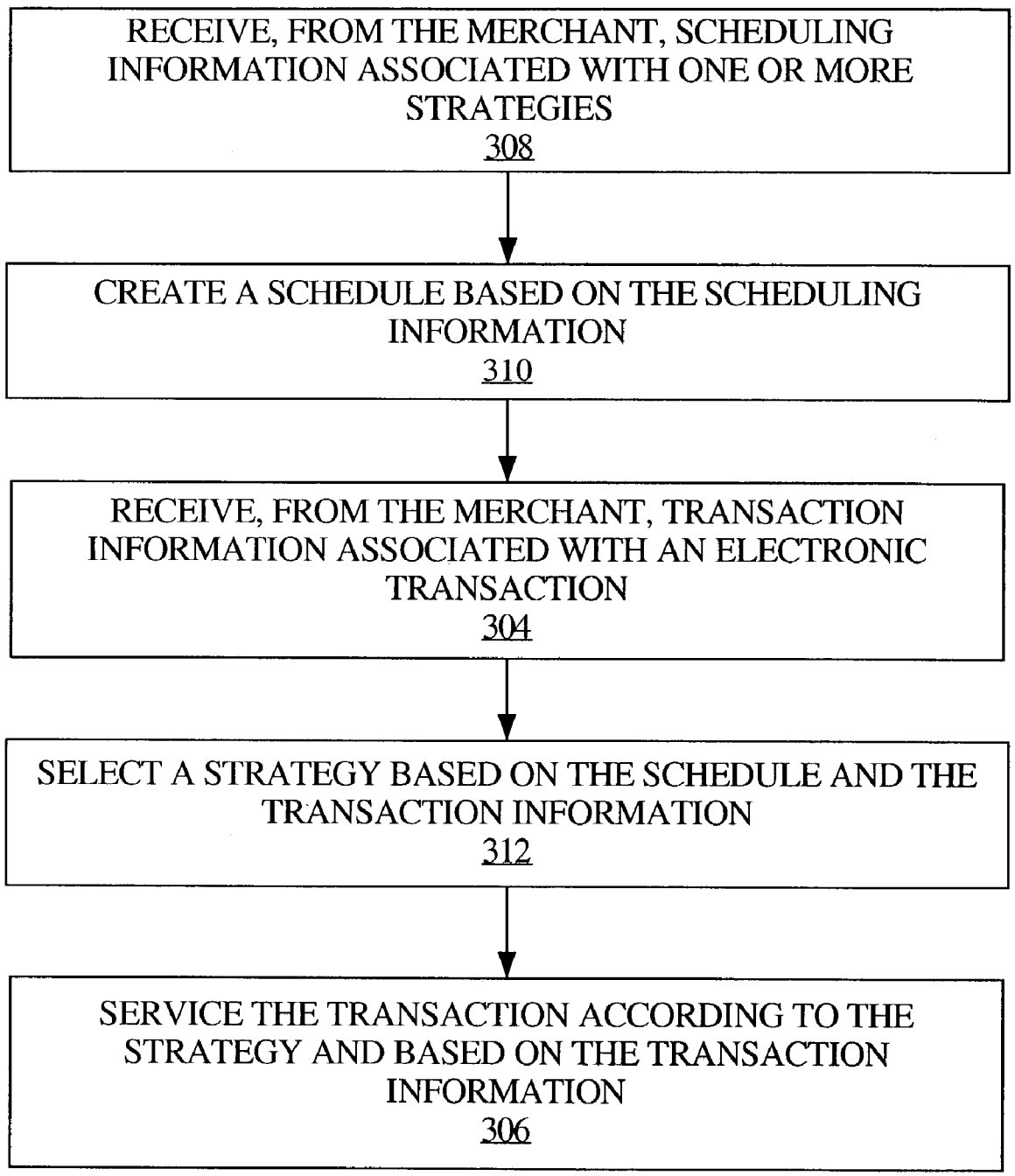
FIG. 3B is a flowchart that illustrates a process for using a hosted electronic transaction service system to process merchant transactions with custom service strategy schedules.

FIG. 3B is a flowchart that illustrates a process for using a hosted electronic transaction service system to process merchant transactions with custom service strategy schedules. At block 308, scheduling information is received from the merchant 104 (FIG. 1). For example, the scheduling information specifies a first strategy to be used to service one or more first transactions associated with the merchant 104, and second strategy to be used to service one or more second transactions associated with the merchant 104. For example, a first strategy could be specified to be used from 6:00 AM to 10:00 PM local time, and a second strategy could be specified to be used from 10:01 PM to 5:59 AM local time. Alternatively, a first strategy could be specified for January 2 through May 31, a second strategy for June 1 through August 31, the first strategy from September 1 through November 28, and a third strategy from November 29 through January 1. In an embodiment, the scheduling information is received in XML format via a SOAP message.

Figure 10A:
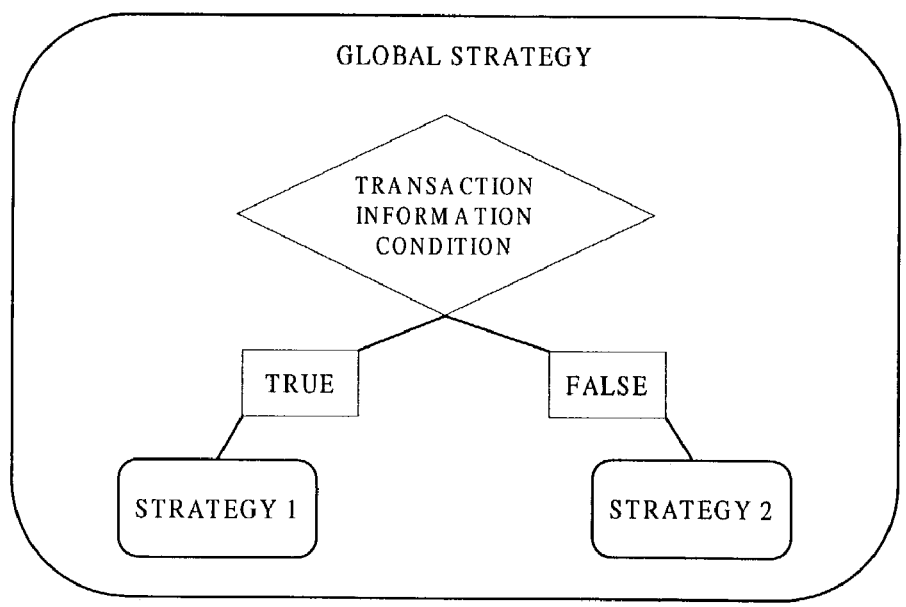
FIG. 10A and FIG. 10B are block diagrams that graphically depict nested strategies.
Figure 10B:
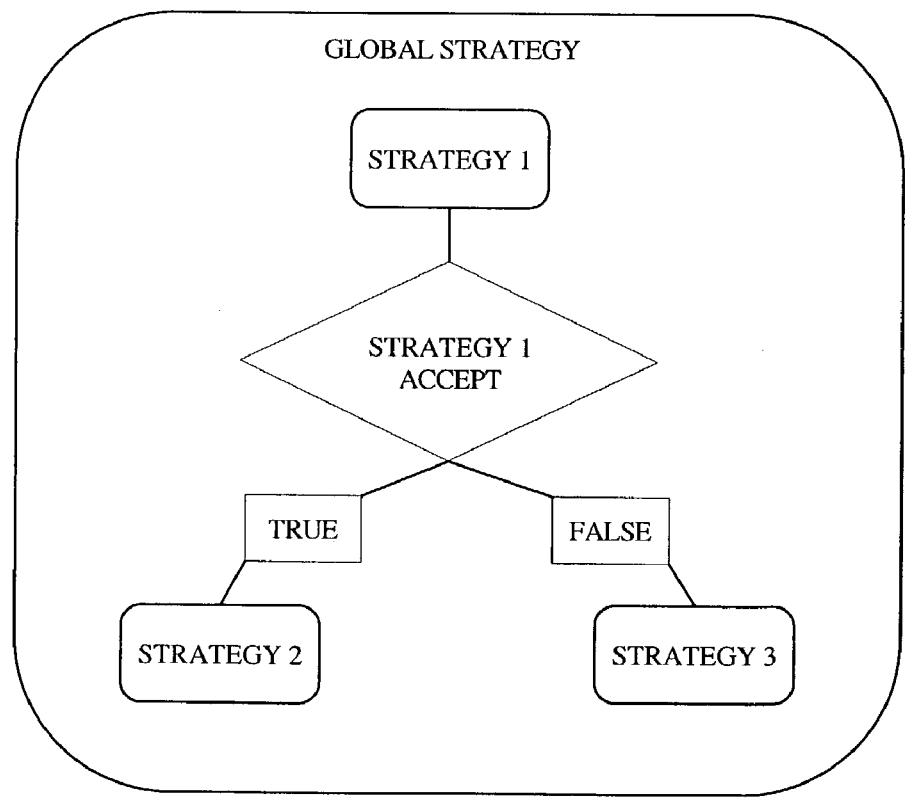

A schedule may be used to specify nested strategies. That is, one strategy can be specified to call another strategy. FIG. 10A and FIG. 10B are block diagrams that graphically depict nested strategies. Furthermore, one strategy can be specified to call another strategy dynamically, based on certain conditions and logic. For example, a merchant 104 may specify a global strategy that specifies a service workflow associated with its transactions. Within that global strategy the merchant 104 may further specify that, based on specific transaction information, a first nested strategy is performed instead of a second nested strategy, as depicted in FIG. 10A. Alternatively, within the global strategy the merchant 104 may further specify that, based on a first specific result of a first nested strategy, a second nested strategy is performed, and based on a second specific result of the first nested strategy, a third nested strategy is performed, as depicted in FIG. 10B. Hence, the ability to nest strategies within a global strategy and to include decision logic within the global strategy to specify service processing paths to take based on dynamic conditions, provides great flexibility to a merchant 104 with respect processing electronic transactions.

At block 310, a schedule is created based on the scheduling information received at block 308. The schedule may be reduced to computer logic representing a number of rules and conditions. Continuing with a preceding example, a condition may reference the date of the electronic transaction, with outputs from the conditions indicating which of a plurality of strategies to apply. At block 304, transaction information associated with an electronic transaction is received from the merchant. Hence, condition inputs may comprise values or parameters extracted from the transaction information. In addition, condition inputs may comprise results of other services or strategies.

At block 312, a strategy from the one or more strategies is selected based on the schedule created at block 310 and, possibly, the transaction information received at block 304. Returning to an example, if the transaction date is January 28, then the first strategy is selected from the first, second and third strategies specified in the scheduling information that is received from a merchant 104 (FIG. 1) at block 308. Finally, at block 306, the electronic transaction to which the transaction information applies is serviced according to the strategy that was selected at block 312 and based on the transaction information received at block 304. Further, if the transaction information indicates a transaction date of December 24, then the third strategy is selected based on the scheduling information received at block 308 and the transaction is serviced accordingly. For example, a fraud screening service might be absent from the third strategy and, therefore, not applied by the service provider 106 (FIG. 1) when servicing the transaction.

Merchant Functional Components

Figure 4:
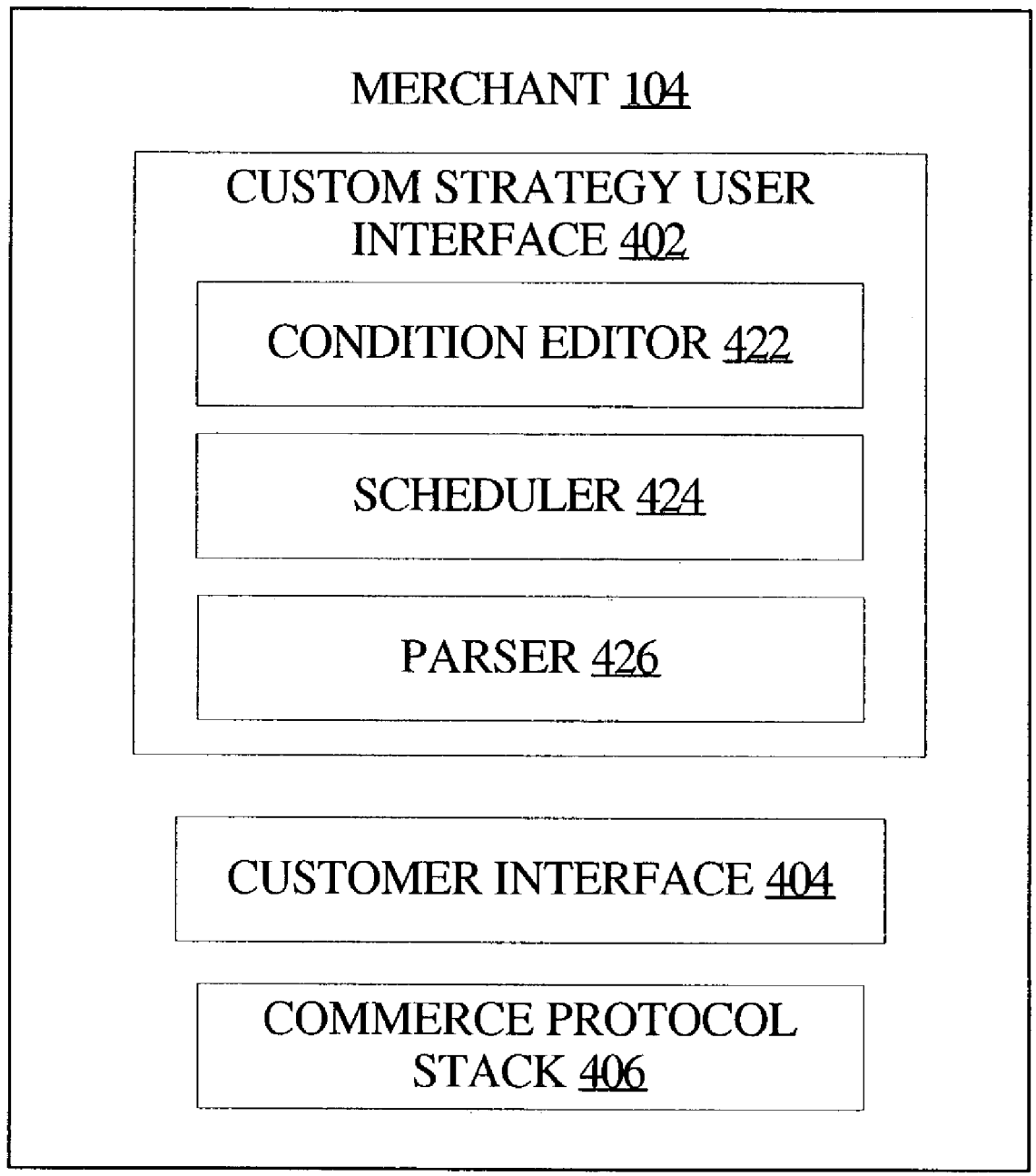
FIG. 4 is a block diagram that illustrates functional and real components utilized by a merchant for customizing a hosted electronic transaction system.

FIG. 4 is a block diagram that illustrates functional and real components utilized by a merchant 104 for customizing a hosted electronic transaction system. Merchant 104 comprises a custom strategy user interface 402 ("user interface"), a customer interface 404 and a commerce protocol stack 406.

User interface 402 is used by a customer or client of service provider 106 (FIG. 1), for example, by merchant 104. User interface 402 comprises a condition editor 422, a scheduler 424, and a parser 426, and is used to build merchant-specified service strategies for associated transactions.

In an embodiment, user interface 402 is used by merchant 104 to graphically represent a service strategy. For example, a strategy can be represented as a graphical decision tree, with conditions based on transaction or other information. The nodes of such a tree represent services offered by service provider 106 (FIG. 1) or resultant actions.

In an embodiment, user interface 402 is implemented as part of a software application executing at merchant 104. For example, the application may be a web application residing at service provider 106 with portions that execute at merchant 104, such as applets, scripts, common gateway interfaces, and the like. Alternatively, the application may execute at service provider 106, and merchant 104 may access the application using a browser.

The underlying application is capable of presenting templates that represent various common or popular strategies, and of presenting graphical figures or icons that represent, for example, conditional operators, logical operators, and services for use by merchant 104 in constructing a customized service strategy. Hence, merchant 104 can easily and intuitively construct and edit custom strategies based on specific product, industry and environment variables. For example, merchant 104 may specify that an export compliance service is performed for products that are export-sensitive. Furthermore, merchant 104 can construct new strategies or edit existing strategies on demand, through user interface 402. Thus, capabilities are provided for members of merchant 104 to quickly and easily adapt their service strategies to changing business conditions, without having to utilize information technology or computer programming assistance.

Condition editor 422 provides the capability for merchant 104 to build complex conditions as part of a service strategy. Examples of conditions are described in reference to block 302 (FIG. 3). Condition editor 422 supports the creation of conditions or conditional statements that are created or customized by merchant 104.

Scheduler 424 provides the capability for merchants 104 to build schedules with respect to their defined service strategies. Examples of incorporating scheduling as part of a service strategy are described in reference to block 308 of FIG. 3. Further, schedules can be simply time or calendar based, or they can be based on conditions as specified by merchant 104 via condition editor 422.

User interface 402 further comprises a parser 426. Parser 426 should be similar to, or at least compatible with, strategy parser 224 (FIG. 2) of electronic transaction service provider 106 (FIG. 1). If service provider 106 strategy parser 224 is not compatible with merchant 104 parser 426, then intermediary software can be configured to make appropriate translations and perform other actions so that a strategy transmitted by merchant 104 is usable by service provider 106. Parser 426 is used to parse strategies that are represented via user interface 402, such as a graphical decision tree, and to convert them into programming logic or a service provider-compatible format, such as XML.

Condition editor 422, scheduler 424, and parser 426 may be separate software modules or an integrated module, and may be separate from the user interface 402 application. Thus, FIG. 4 illustrates this functionality as within or part of user interface 402 as an example, and embodiments are not limited to such a configuration.

Customer interface 404 is an interface between merchant 104 and customer 102 (FIG. 1). Customer interface 404 is a facilitator of information exchange between customer 102 and merchant 104. For example, transaction-related information can be collected by merchant 104 via a conventional card reader that transmits the data to service provider 106 through the telephone network or through the Internet using a modem. For another example, information can be collected from a customer 102 through an e-commerce web page associated with a merchant 104 that is displayed on a customer 102 computer workstation, using appropriate conventional technology such as a script computer language, a common gateway interface process, Java-based applications, and the like.

Commerce protocol stack 406 is similar to commerce protocol stack 222 (FIG. 2), and is used for communicating with service providers 106 that utilize a compatible protocol stack. Commerce protocol stack 406 represents software elements and processes used to communicate transaction and other information between a merchant 104 and service provider 106. For a non-limiting example, protocol stack 406 may comprise the software elements and processes that implement SOAP. Preferably, stack 406 and stack 222 facilitate the same or compatible protocols. Otherwise, an intermediary module is used to translate one protocol used by a customer 102 to another different protocol used by a merchant 104.

Process for Customizing a Hosted Electronic Transaction Service System

Figure 5A:
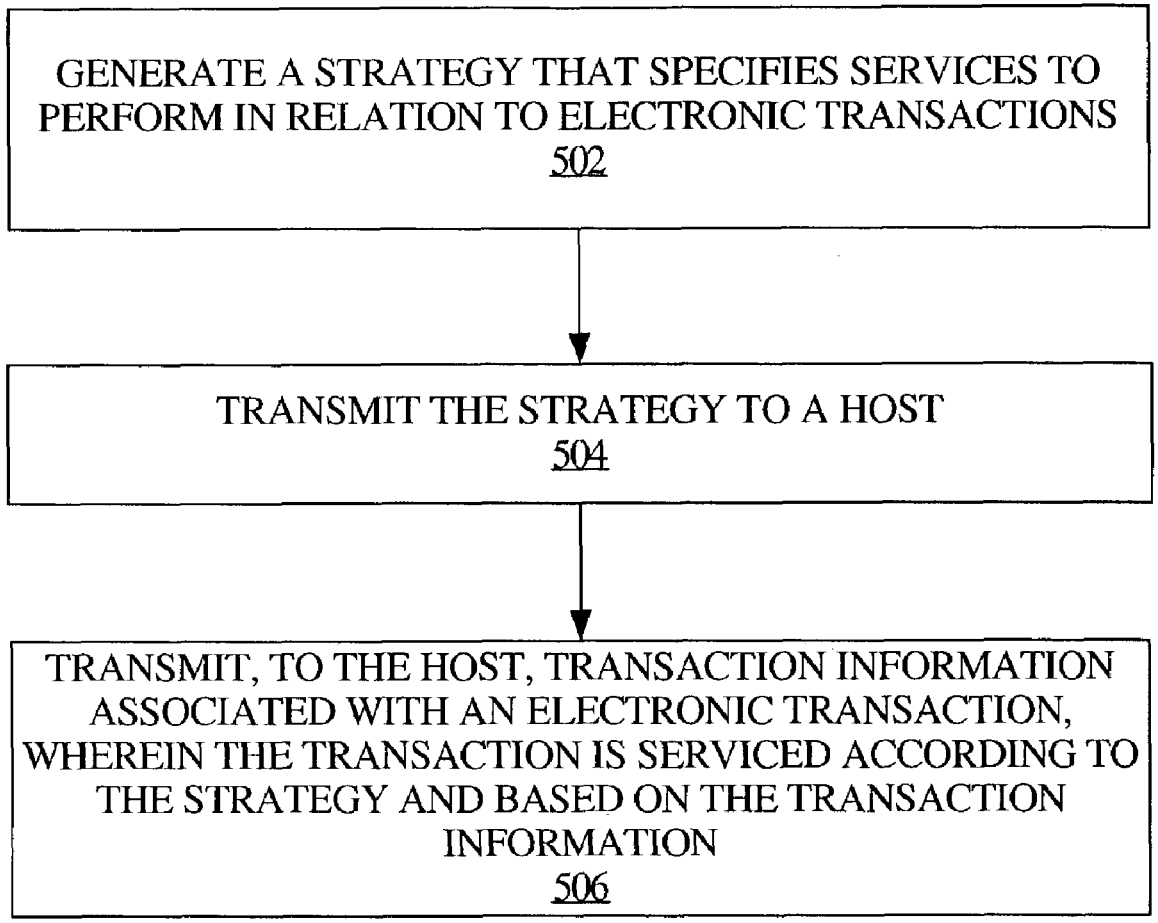
FIG. 5A is a flowchart that illustrates a process for customizing a hosted electronic transaction service system.

FIG. 5A is a flowchart that illustrates a process for customizing a hosted electronic transaction service system, from the perspective of a merchant or client of the system.

At block 502, a strategy that specifies one or more services to perform in relation to an electronic transaction is generated. As described in reference to user interface 402 (FIG. 4), a merchant 104 (FIG. 1) can construct a custom service strategy that directs a service provider 106 as to how the merchant 104 wants its electronic transactions processed; more specifically, what services to apply to the transaction and in what order. A custom service strategy can be constructed through use of fields provided by the merchant, such as bill_country, amount and shipping_method, and through use of custom fields specified by merchant 104.

In an embodiment, the strategy can be represented in a graphical decision tree format, with nodes representing services provided by service provider 106 or other actions custom-created by merchant 104. Further, the strategy can be translated into another format, such as XML, by a parser, such as parser 426 (FIG. 4).

Through use of custom strategy user interface 402, merchant 104 can construct and generate a customized service strategy related to a suite of electronic transaction services offered by a service provider 106, without having to program a software application. Hence, people without experience in computer programming can easily create or modify a strategy that can remotely affect the behavior of the service provider 106. Furthermore, merchant 104 can request that its transactions are processed in a certain manner, without having to modify transaction information provided to the service provider 106.

Figure 8:
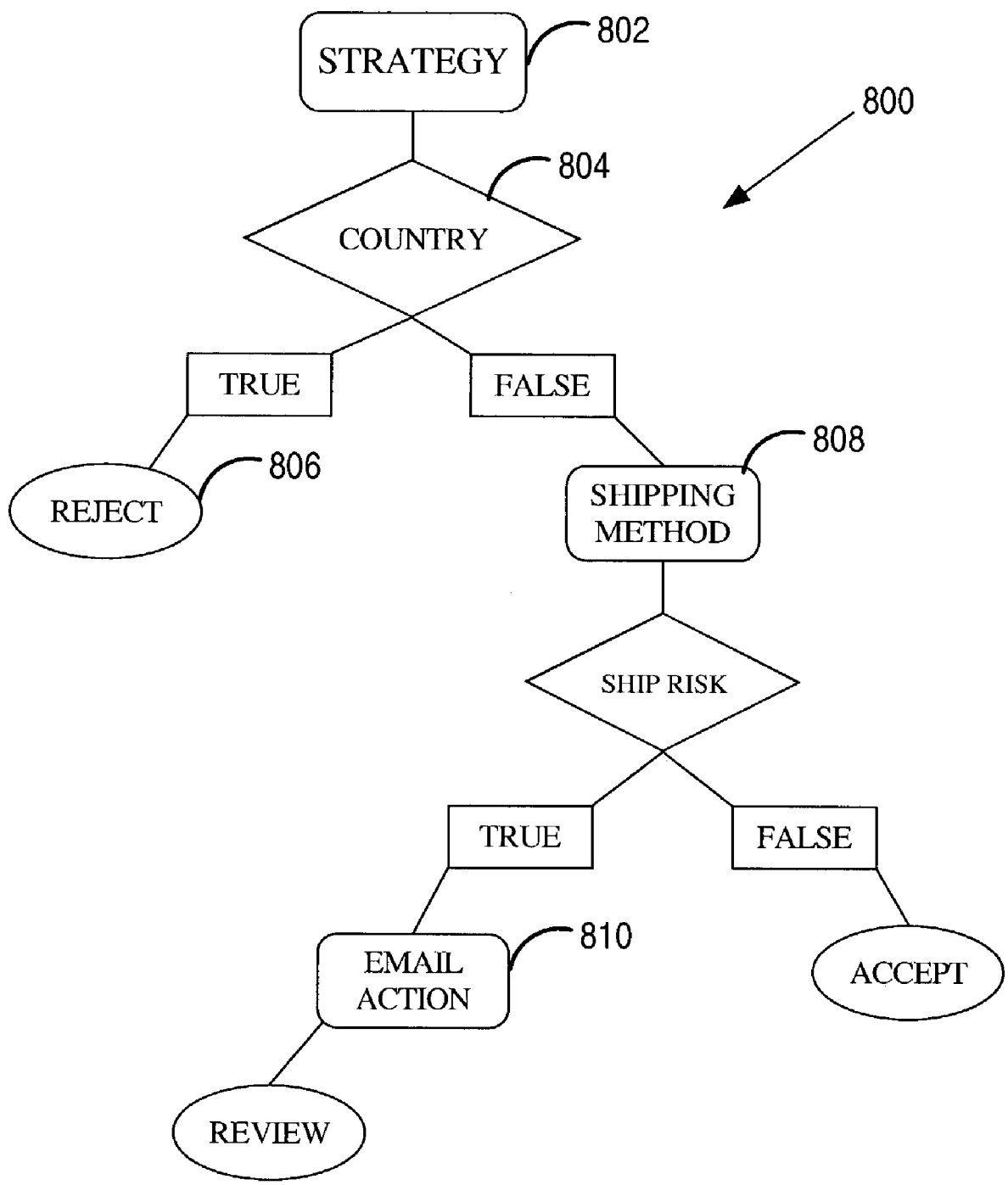
FIG. 8 is an example of a custom service strategy for processing electronic transactions in a hosted service environment.

FIG. 8 is an example of a custom service strategy 800 for processing electronic transactions in a hosted service environment. A strategy can include rules, plug-in calls, and other components. Plug-ins include third party software modules, routines, applications, services and actions. Further, a strategy can specify conditions within a given module. Each rule evaluates one or more fields of transaction information, or a result of another rule. In one embodiment, rules can have two results: True or False, depending on whether the transaction information meets the conditions of the rule.

Block 802 represents the beginning of the service strategy 800. Block 804 represents a rule, which would evaluate to True if the product or service associated with the electronic transaction is to ship to a designated country, which can be determined by the shipping address portion of the transaction information, or would evaluate to False if the product or service is not to ship to a designated country. Block 806 represents a decision point, which in the case of this example, is Reject, whereby the electronic transaction is rejected.

Block 808 is a module call, which calls a Shipping Method routine that is constituent to a transaction processing service (e.g., Internet Verification System) offered by the relevant service provider 106 (FIG. 1). A module can contain rules and/or plug-ins and can be shared by multiple service strategies and can be customized for different applications of a strategy. As such, a module functions like a strategy; however, according to one non-limiting implementation, a transaction cannot be accepted, rejected or reviewed within a module. Modules can be used at any node of a service strategy and can be called as the result of evaluation of a rule. Modules can be used to combine information from different sources and to distill the information into one or more fields for further evaluation.

Block 810 is a plug-in call to a plug-in routine that can be used as part of a service strategy. For example, block 810 Email Action may represent a call to a script that automatically transmits an e-mail to a merchant 104 (FIG. 1) representative for transaction review. For another example, an AddFields plug-in can add or modify fields of transaction information so that a field such as rule_code can be added to the transaction information to indicate a reason for determining that a given transaction is deemed a risky transaction.

In an embodiment in which a user interface is provided to construct and edit graphical representations of electronic transaction service strategies, components of strategy, such as service strategy 800, can be readily edited by interacting with the components via the user interface. For example, clicking on block 810 triggers display of an on-line edit window to facilitate the revision of the Email Action component of the service strategy by a merchant 104. Additionally, to add components to a service strategy, clicking on a line constituent to a strategy triggers display of an on-line data entry window to facilitate entry of a component, such as a module call, decision block, or plug-in call, by a merchant 104.

Rules can comprise joining operators to combine multiple conditions, such as AND and OR operators. Conditional parameters can be in the form of text, Boolean values, expressions and the like. Furthermore, comparison operators such as equal to, not equal to, less than, greater than, less than or equal to, etc., can also be used within rules that are constituent to a service strategy.

A strategy can be created and requested for application to subsequent transactions substantially instantaneously. Thus, merchant 104 is not required to experience significant lag time between constructing a new strategy and applying the new strategy to electronic transactions. In addition, successive messages from a merchant 104 to a service provider 106, such as SOAP messages, with each message typically being associated with a different electronic transaction, can invoke different strategies.

Multiple custom service strategies can be generated by a given merchant 104 and stored at a service provider 106. Thus, each different merchant 104 that uses a given service provider's 106 hosted electronic transaction services can create their own portfolio of service strategies. Further, merchants 104 can designate, for example, in which situations or at what times to use different strategies from their portfolio.

At block 504, the strategy generated at block 502 is transmitted to a host of electronic transaction services, such as service provider 106 (FIG. 1). As with the strategy receiving step associated with a service provider 106 at block 302 of FIG. 3, the strategy may be transmitted to the host as part of a SOAP, or other suitable protocol, message. Further, the strategy may be transmitted as an XML file or in another format, such as a proprietary format used by a service provider 106.

At block 506, transaction information associated with a specific electronic transaction is transmitted to the host, where the transaction is serviced according to the strategy generated at block 502 and the transaction information. Hence, service provider 106 will apply its services that are specified by merchant 104 in its strategy, to the electronic transaction represented by the transaction information, in the order specified by merchant 104 in the strategy. A manner in which a strategy is applied to a transaction is described in reference to block 306 of FIG. 3.

In an embodiment, block 506 includes transmitting client-specified or client-specific data, and block 502 includes generating a strategy that includes a conditional expression associated with the client-specified data. For example, a merchant 104 may use a proprietary code to represent geographic areas of a large city, where historical data shows an increased rate of fraud relating to transactions originated in an area represented by a given code. Then, a strategy is constructed using the geographic code as a condition for running a fraud screening, whereby fraud screening is only performed on transactions associated with the given code. This embodiment is not limited to the preceding example because the client-specific data and the conditional expressions thereon are limitless.

Figure 9A:
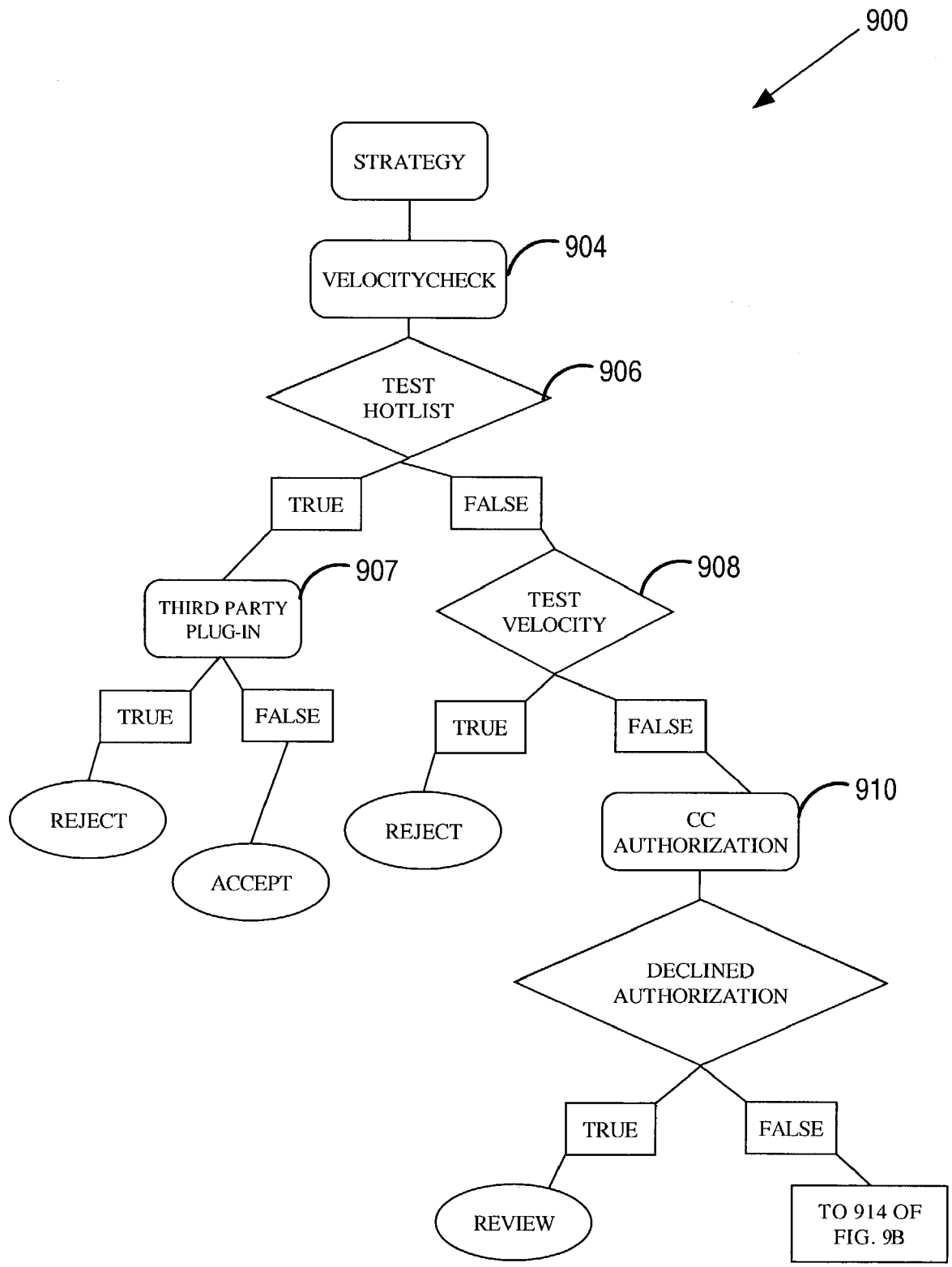
FIGS. 9A and 9B illustrate an example of a custom service strategy for processing electronic transactions in a hosted service environment.
Figure 9B:
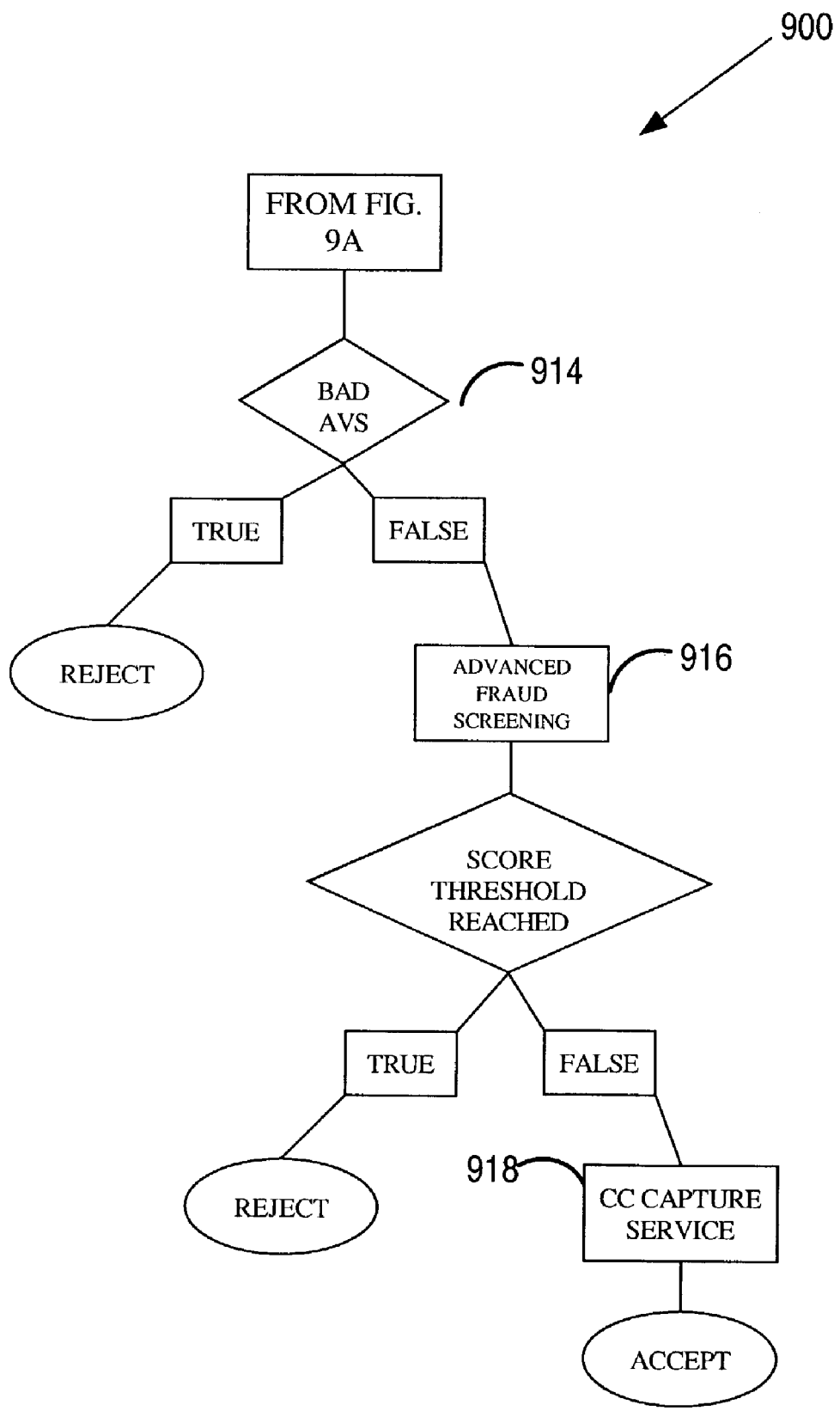

FIGS. 9A and 9B illustrate an example of a custom service strategy 900 for processing electronic transactions in a hosted service environment.

Block 904 calls a VelocityCheck function, which checks whether a single credit card number is being used with multiple addresses or expiration dates, or if a single address or phone number is being used with multiple credit cards. If any of such occurrences happens within a specified time period, VelocityCheck creates reply fields that indicate which velocity checks were triggered. Note that in one embodiment the VelocityCheck function does not automatically mark a transaction for review if a velocity check is triggered. Rules are to be included in the service strategy to interpret the reply fields of the VelocityCheck. VelocityCheck can be used anywhere in a service strategy, including as a preprocessing routine, which would have it execute at the beginning of the processing of an electronic transaction, or a post-processing routine, which would have it execute at the end of the processing.

As mentioned, the strategy should include a rule or condition to evaluate and act upon the results of a VelocityCheck evaluation. For example, block 908, Test Velocity, provides logic to strategy 900 with respect to velocity, whereby a True result causes rejection of the transaction and a False result continues the transaction evaluation process embodied in strategy 900, to block 910 to invoke a credit card authorization service.

A hotlist enables a merchant to store known information about transactions, for example, in the case of a negative hotlist, transactions that are known to be fraudulent. Likewise, positive hotlists can be used to store information about preferred customers, so that their orders are not inadvertently rejected. Hotlists can be updated in real time, without the need to update the service strategy. Examples of information that can be stored in a hotlist include credit card numbers, email addresses, phone numbers, street addresses, and the like. Hotlists are used in a service strategy, such as strategy 900.

Further, the strategy should also include a condition to evaluate and act upon a hotlist. For example, block 906, Test Hotlist, provides logic to strategy 900 with respect to a hotlist, whereby a False result continues the transaction evaluation process to block 908 to test velocity in conjunction with the VelocityCheck routine run at block 904. In an embodiment, hotlist files are XML documents, and can be transmitted to and from a merchant 104 (FIG. 1) to a service provider 106 (FIG. 1), for example, to a decision server of service provider.

Block 907 depicts a third party plug-in to which the strategy makes a call. In this example, the plug-in comprises a service or possibly a suite of services embodied in software code and offered by one other than the merchant 104 or service provider 106.

At block 910, a credit card authorization service is performed. If authorization is declined, then the transaction is flagged for manual review by merchant 102 or possibly by service provider 106. If authorization is not declined, then the process continues to block 914 of FIG. 9B.

At block 914, if an address associated with a transaction is deemed, via an address verification system, to have a "bad" address, the transaction is rejected at that point in the process. If the address is not deemed to be bad, at block 914, the process continues to block 916 for performance of an advanced fraud screening service. If a score generated by the advanced fraud screening exceeds a threshold, which is perhaps set by merchant 104 for its transactions, then the transaction is rejected. If the score does not meet or exceed the threshold, then a credit card capture service is performed at block 918, the transaction is accepted, and the customer's credit card is charged.

Note that suites of services can be invoked within a strategy, whether the suite is provided by service provider 106 or by a third party such as with a plug-in at block 907. When a service suite is invoked a service strategy such as strategy 900, performance of one or more services of the suite can be dictated by the strategy 900. For example, strategy 900 may specify that within a given service suite, the constituent services, or checks, are to be performed in a specified order. Conditions that underlie each respective service of a service suite are evaluated to determine which branch of the strategy is to be followed in processing a given electronic transaction for a merchant.

Hence, FIGS. 9A-9B illustrate a fairly complex service strategy that can be constructed by a merchant 104 (FIG. 1) through use of embodiments described herein. The graphical depiction of strategy 900 is converted to a data format, which can then be transmitted to a service provider 106 (FIG. 1) host for storage and use in evaluating the merchant's electronic transactions. A given strategy constructed and applied through the embodiments can include specification of any number of stand-alone services or services that are constituent to any number of different service suites offered by a service provider. Hence, a given service strategy can span multiple service offerings of a given service provider. Furthermore, such strategies can be constructed by a merchant remote to the decision server that actually applies the strategy to transactions, such as a decision server at a service provider 106 that offers hosted electronic transaction services.

Figure 5B:
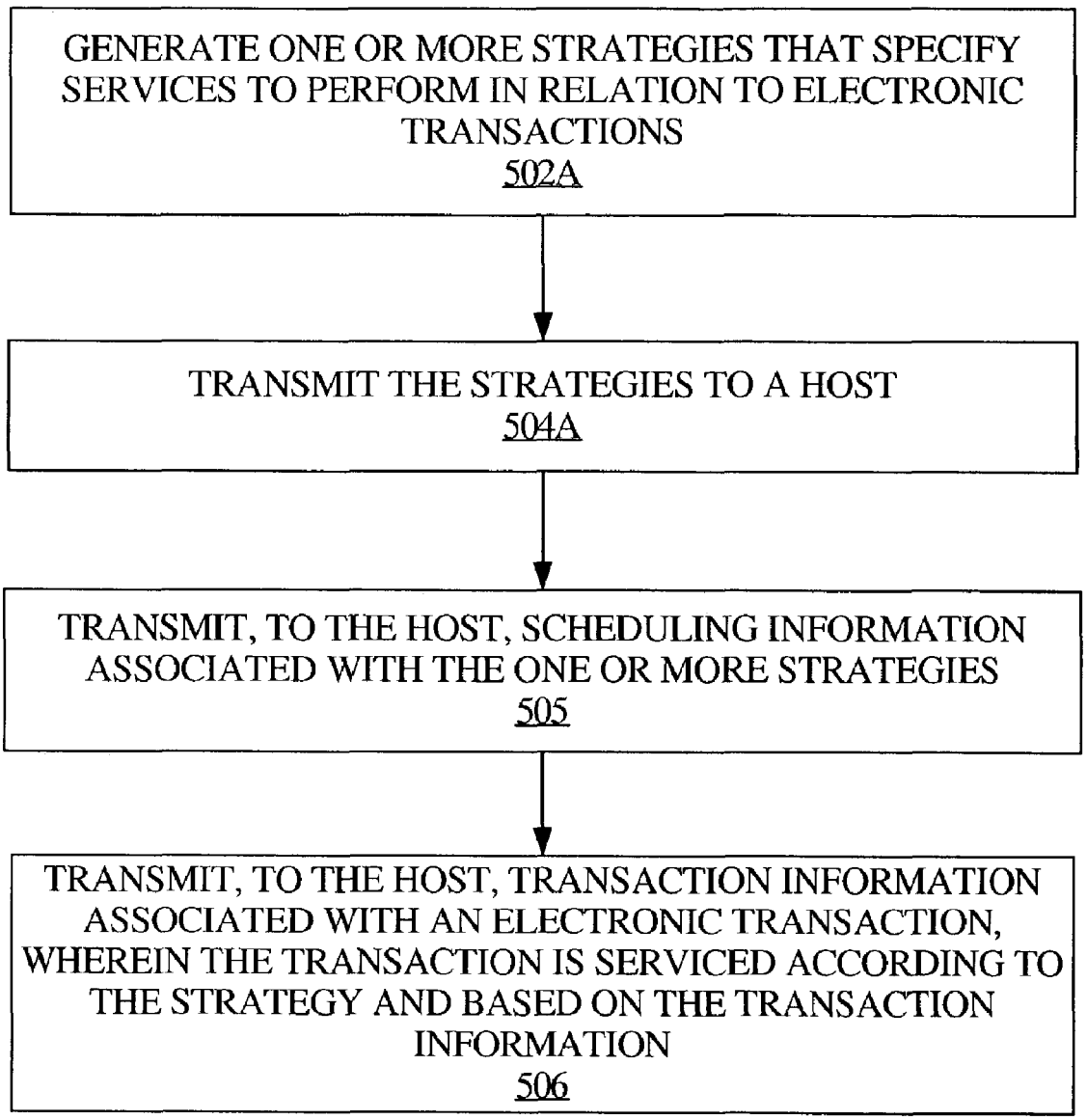
FIG. 5B is a flowchart that illustrates a process for customizing a hosted electronic transaction service system using a schedule.

FIG. 5B is a flowchart that illustrates a process for customizing a hosted electronic transaction service system using a schedule.

At block 502A, one or more strategies that specify one or more services to perform in relation to electronic transactions are generated, as described above. At block 504A, the strategies generated at block 502 are transmitted to a host of electronic transaction services, such as a service provider 106 (FIG. 1), as described above.

At block 505, scheduling information associated with the one or more strategies is transmitted to the host. For example, the scheduling information may specify a first strategy to be used to service one or more first transactions and second strategy to be used to service one or more second transactions. The description associated with block 308 of FIG. 3 provides for examples of scheduling information and the use thereof that may be used in the process of FIG. 5B.

At block 506, transaction information associated with a specific electronic transaction is transmitted to the host, where the transaction is serviced according to the strategy generated at block 502 and the transaction information. Hence, service provider 106 (FIG. 1) will apply its services that are specified by merchant 104 (FIG. 1) in one of the strategies, to the electronic transaction represented by the transaction information. The strategy that is applied is based on the schedule specified by merchant 104, and the order in which the one or more services are applied is specified in the strategy. A manner in which a strategy is applied to a transaction is described in reference to block 306 of FIG. 3.

Implementation Mechanisms—Hardware Overview

Figure 6:
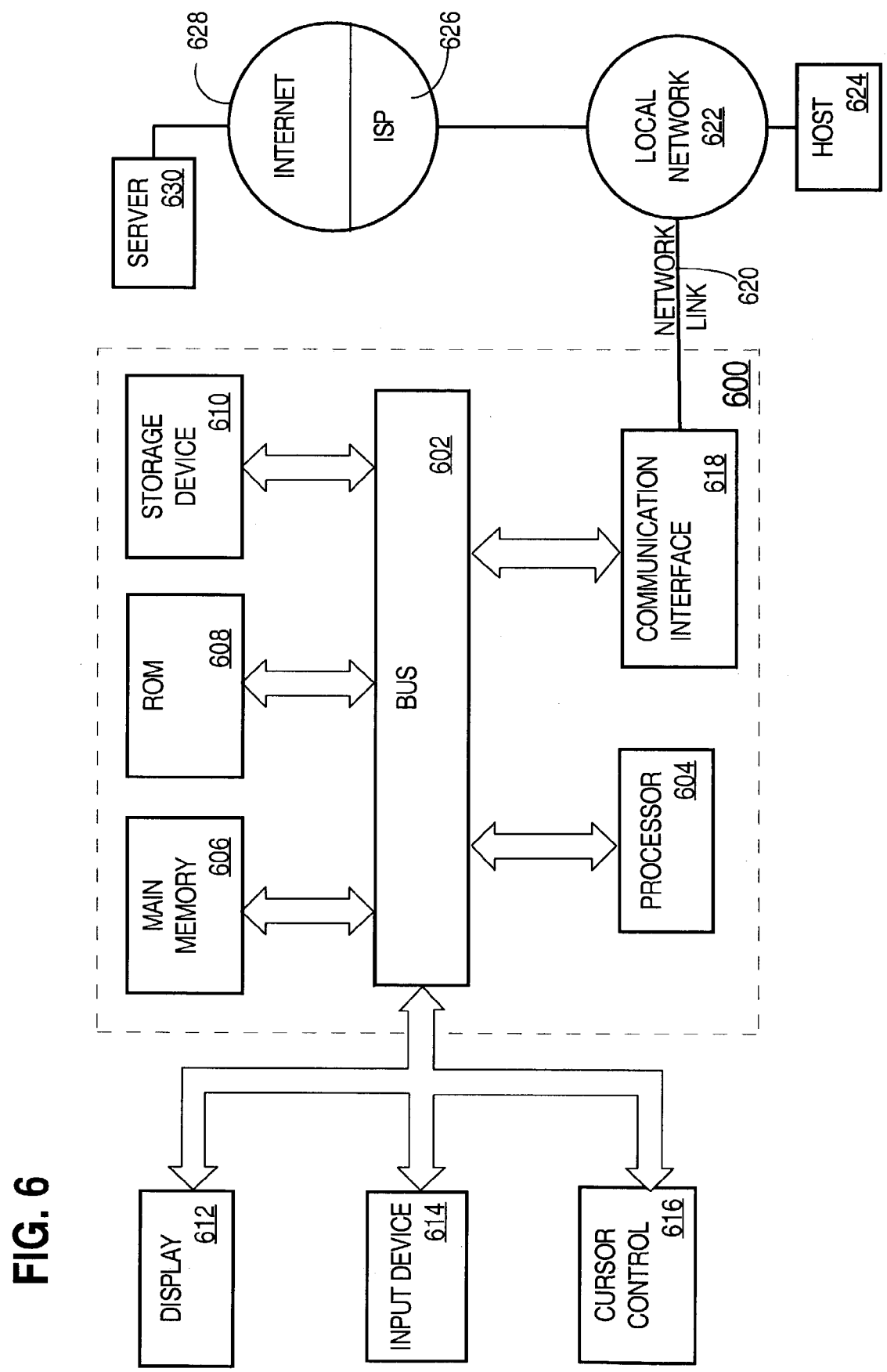
FIG. 6 is a block diagram that illustrates a computer system upon which an embodiment may be implemented.
Figure 7:
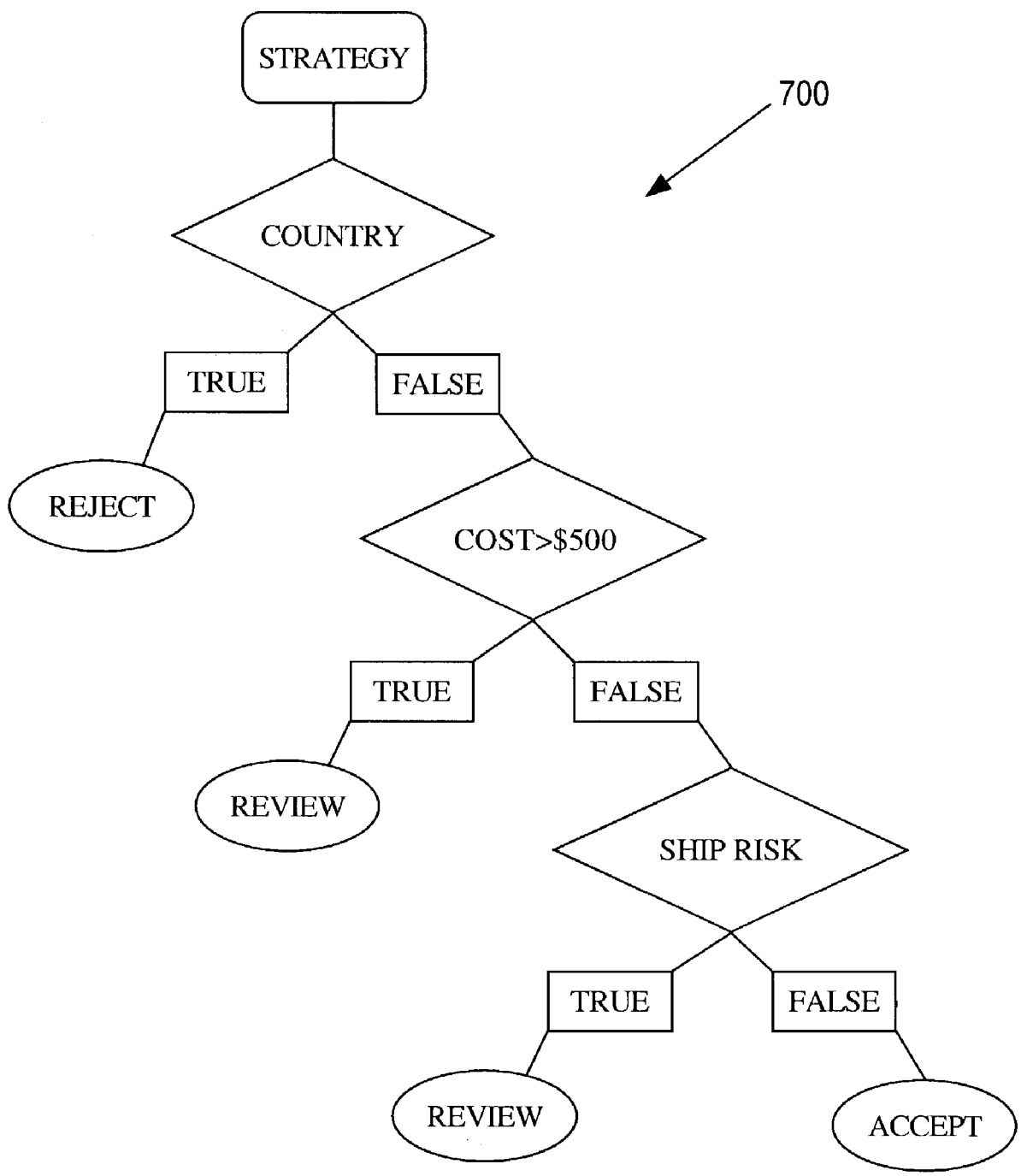
FIG. 7 is an illustration of a simple example of a graphical representation of a business strategy.

FIG. 6 is a block diagram that illustrates a computer system 600 upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Embodiments are related to the use of computer system 600 for custom strategy specification in a hosted electronic transaction service system. According to embodiments of the invention, custom strategies are generated and/or applied by a computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical, magnetic or magneto-optical disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for custom strategy specification as described herein.

The received code may be executed by processor 604 as it is received, and/or stored in storage device 610, or other non-volatile storage for later execution. In this manner, computer system 600 may obtain application code in the form of a carrier wave.

What is claimed is:

1. A method for processing transactions in a hosted electronic transaction service system based on a custom strategy, the method comprising the steps of:
   receiving, at a host of the hosted electronic transaction service system, a strategy from a merchant, wherein the strategy specifies one or more services to perform in relation to an electronic transaction associated with the merchant and specifies one or more actions, selected from an action library, to perform in response to performance of at least one of the specified one or more services;
   wherein the strategy describes a flow of rules that comprises a logical hierarchy in which an order of processing is programmatically determinable, and wherein the rules evaluate to a boolean value and are associated with a respective action to perform in response to the boolean value;
   receiving, at the host and from the merchant, transaction information associated with an electronic transaction; and
   the host servicing the electronic transaction according to the strategy and based on the transaction information, including performing the one or more actions in response to performance of the at least one of the specified one or more services,
   wherein the one or more services specified in the strategy comprise at least one service from each of at least two service types from a suite of service types offered by the host and consisting of (a) payment services, (b) stored value services, (c) risk management services, (d) fulfillment management services, and (e) distribution control services.

2. The method of claim 1, wherein the step of receiving a strategy includes receiving a strategy that further specifies an order in which the host is to perform the one or more services.

3. The method of claim 1, wherein the step of receiving a strategy includes receiving a strategy that includes a conditional expression.

4. The method of claim 1, wherein the step of receiving a strategy includes receiving the strategy represented as an XML document.

5. The method of claim 1, further comprising the step of:
   receiving, from the merchant, scheduling information associated with one or more strategies, wherein the scheduling information specifies a first strategy to be used to service one or more first transactions and a second strategy to be used to service one or more second transactions.

6. The method of claim 1, wherein the step of receiving a strategy comprises the step of:
   receiving a strategy that specifies a first strategy to be used to further service the electronic transaction when transaction information is in a first state and a second strategy to be used to further service the electronic transaction when the transaction information is in a second state.

7. The method of claim 1, wherein the step of receiving a strategy comprises the step of:
   receiving a strategy that specifies a second strategy to be used to further service the electronic transaction when a first strategy outputs a first result and a third strategy to be used to further service the electronic transaction when the first strategy outputs a second result.

8. The method of claim 1, wherein the step of receiving transaction information includes receiving transaction information as part of a Simple Object Access Protocol message.

9. The method of claim 1, wherein servicing the electronic transaction comprises:
converting the strategy into programming logic that forms a decision hierarchy, and
traversing the decision hierarchy to service the electronic transaction according to the strategy.

10. A computer-readable medium having one or more sequences of instructions for processing transactions in a hosted electronic transaction service system based on a custom strategy, which instructions, when executed by one or more processors, cause the one or more processors to perform the steps of:
receiving, at a host of the hosted electronic transaction service system, a strategy from a merchant, wherein the strategy specifies one or more services to perform in relation to an electronic transaction associated with the merchant and specifies one or more actions, selected from an action library, to perform in response to performance of at least one of the specified one or more services;
wherein the strategy describes a flow of rules that comprises a logical hierarchy in which an order of processing is programmatically determinable, and wherein the rules evaluate to a boolean value and are associated with a respective action to perform in response to the boolean value;
receiving, at the host and from the merchant, transaction information associated with an electronic transaction; and
the host servicing the electronic transaction according to the strategy and based on the transaction information, including performing the one or more actions in response to performance of the at least one of the specified one or more services,
wherein the one or more services specified in the strategy comprise at least one service from each of at least two service types from a suite of service types offered by the host and consisting of (a) payment services, (b) stored value services, (c) risk management services, (d) fulfillment management services, and (e) distribution control services.

11. The computer-readable medium of claim 10, wherein execution of the one or more sequences of instructions causes the one or more processors to perform the step of receiving a strategy by receiving a strategy that further specifies an order in which the host is to perform the one or more services.

12. The computer-readable medium of claim 10, wherein execution of the one or more sequences of instructions causes the one or more processors to perform the step of receiving a strategy by receiving a strategy that includes a conditional expression.

13. The computer-readable medium of claim 10, wherein execution of the one or more sequences of instructions causes the one or more processors to perform the step of receiving a strategy by receiving the strategy represented as an XML document.

14. The computer-readable medium of claim 10, wherein execution of the one or more sequences of instructions causes the one or more processors to further perform the step of:
receiving, from the merchant, scheduling information associated with one or more strategies, wherein the scheduling information specifies a first strategy to be used to service one or more first transactions and a second strategy to be used to service one or more second transactions.

15. The computer-readable medium of claim 10, wherein execution of the one or more sequences of instructions causes the one or more processors to perform the step of receiving a strategy by performing the step of:
receiving a strategy that specifies a first strategy to be used to further service the electronic transaction when transaction information is in a first state and a second strategy to be used to further service the electronic transaction when the transaction information is in a second state.

16. The computer-readable medium of claim 10, wherein execution of the one or more sequences of instructions causes the one or more processors to perform the step of receiving a strategy by performing the step of:
receiving a strategy that specifies a second strategy to be used to further service the electronic transaction when a first strategy outputs a first result and a third strategy to be used to further service the electronic transaction when the first strategy outputs a second result.

17. The computer-readable medium of claim 10, wherein execution of the one or more sequences of instructions causes the one or more processors to perform the step of receiving transaction information by receiving transaction information as part of a Simple Object Access Protocol message.

18. The computer-readable medium of claim 10, wherein the instructions for servicing the electronic transaction comprise instructions for performing the steps of:
converting the strategy into programming logic that forms a decision hierarchy, and
traversing the decision hierarchy to service the electronic transaction according to the strategy.

19. An apparatus for processing transactions in a hosted electronic transaction service system based on a custom strategy, comprising:
means for receiving, at a host of the hosted electronic transaction service system, a strategy from a merchant, wherein the strategy specifies one or more services to perform in relation to an electronic transaction associated with the merchant and specifies one or more actions, selected from an action library, to perform in response to performance of at least one of the specified one or more services;
wherein the strategy describes a flow of rules that comprises a logical hierarchy in which an order of processing is programmatically determinable, and wherein the rules evaluate to a boolean value and are associated with a respective action to perform in response to the boolean value;
means for receiving, at the host and from the merchant, transaction information associated with an electronic transaction; and
means for the host servicing the electronic transaction according to the strategy and based on the transaction information, including performing the one or more actions in response to performance of the at least one of the specified one or more services,
wherein the one or more services specified in the strategy comprise at least one service from each of at least two service types from a suite of service types offered by the host and consisting of (a) payment services, (b)

stored value services, (c) risk management services, (d) fulfillment management services, and (e) distribution control services.

20. The apparatus of claim 19, wherein the means for servicing the electronic transaction comprises:
means for converting the strategy into programming logic that forms a decision hierarchy, and
means for traversing the decision hierarchy to service the electronic transaction according to the strategy.

21. A network device that can process transactions in a hosted electronic transaction service system based on a custom strategy, the network device comprising:
a network interface;
a processor coupled to the network interface and receiving network messages from the network through the network interface;
a computer-readable medium storing one or more sequences of instructions which, when executed by the processor, cause the processor to perform the steps of:
receiving, at a host of the hosted electronic transaction service system, a strategy from a merchant, wherein the strategy specifies one or more services to perform in relation to an electronic transaction associated with the merchant and specifies one or more actions, selected from an action library, to perform in response to performance of at least one of the specified one or more services;
wherein the strategy describes a flow of rules that comprises a logical hierarchy in which an order of processing is programmatically determinable, and wherein the rules evaluate to a boolean value and are associated with a respective action to perform in response to the boolean value;
receiving, at the host and from the merchant, transaction information associated with an electronic transaction; and
the host servicing the electronic transaction according to the strategy and based on the transaction information, including performing the one or more actions in response to performance of the at least one of the specified one or more services,
wherein the one or more services specified in the strategy comprise at least one service from each of at least two service types from a suite of service types offered by the host and consisting of (a) payment services, stored value services, (c) risk management services, (d) fulfillment management services, and (e) distribution control services.

22. The device of claim 21, wherein the instructions for servicing the electronic transaction comprise instructions for performing the steps of:
converting the strategy into programming logic that forms a decision hierarchy, and
traversing the decision hierarchy to service the electronic transaction according to the strategy.

* * * * *